(12) United States Patent
Ramos-Izquierdo et al.

(10) Patent No.: US 10,095,041 B2
(45) Date of Patent: Oct. 9, 2018

(54) LASER BEAM EXPANDER WITH ADJUSTABLE COLLIMATION

(71) Applicant: The United States of America as represented by the Administrator of the National Aeronautics and Space Administration, Washington, DC (US)

(72) Inventors: Luis A. Ramos-Izquierdo, Washington, DC (US); Xiaoli Sun, Bethesda, MD (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 0 days.

(21) Appl. No.: 15/180,245

(22) Filed: Jun. 13, 2016

(65) Prior Publication Data

US 2017/0357096 A1    Dec. 14, 2017

(51) Int. Cl.
*G02B 27/30*    (2006.01)
*G02B 27/09*    (2006.01)
*G02B 7/02*    (2006.01)

(52) U.S. Cl.
CPC .......... *G02B 27/0955* (2013.01); *G02B 7/021* (2013.01); *G02B 7/023* (2013.01); *G02B 7/028* (2013.01); *G02B 27/30* (2013.01)

(58) Field of Classification Search
CPC .... G02B 27/0955; G02B 27/30; G02B 7/021; G02B 7/028; G02B 7/023
See application file for complete search history.

(56) References Cited

U.S. PATENT DOCUMENTS

| 7,706,078 B2 * | 4/2010 | Tanaka ............... G02B 27/0927 359/679 |
| 2011/0043880 A1 * | 2/2011 | Adams ............... G02B 7/1805 359/221.2 |

* cited by examiner

*Primary Examiner* — Alicia M Harrington
(74) *Attorney, Agent, or Firm* — Christopher O. Edwards; Bryan A. Geurts; Mark P. Dvorscak

(57) ABSTRACT

A laser beam expander has at least two negative lenses with adjustable collimation. The amount of required motion can be reduced by an order of magnitude over single negative lens approaches by splitting the input lens in two and adjusting the small remaining air gap between the lenses. The change in collimation may be accomplished by heating/cooling (i.e., thermal), mechanical motion (e.g., motors), electro-optical means (e.g., applying or reducing an electric current), any combination thereof, or any other suitable mechanism.

18 Claims, 8 Drawing Sheets

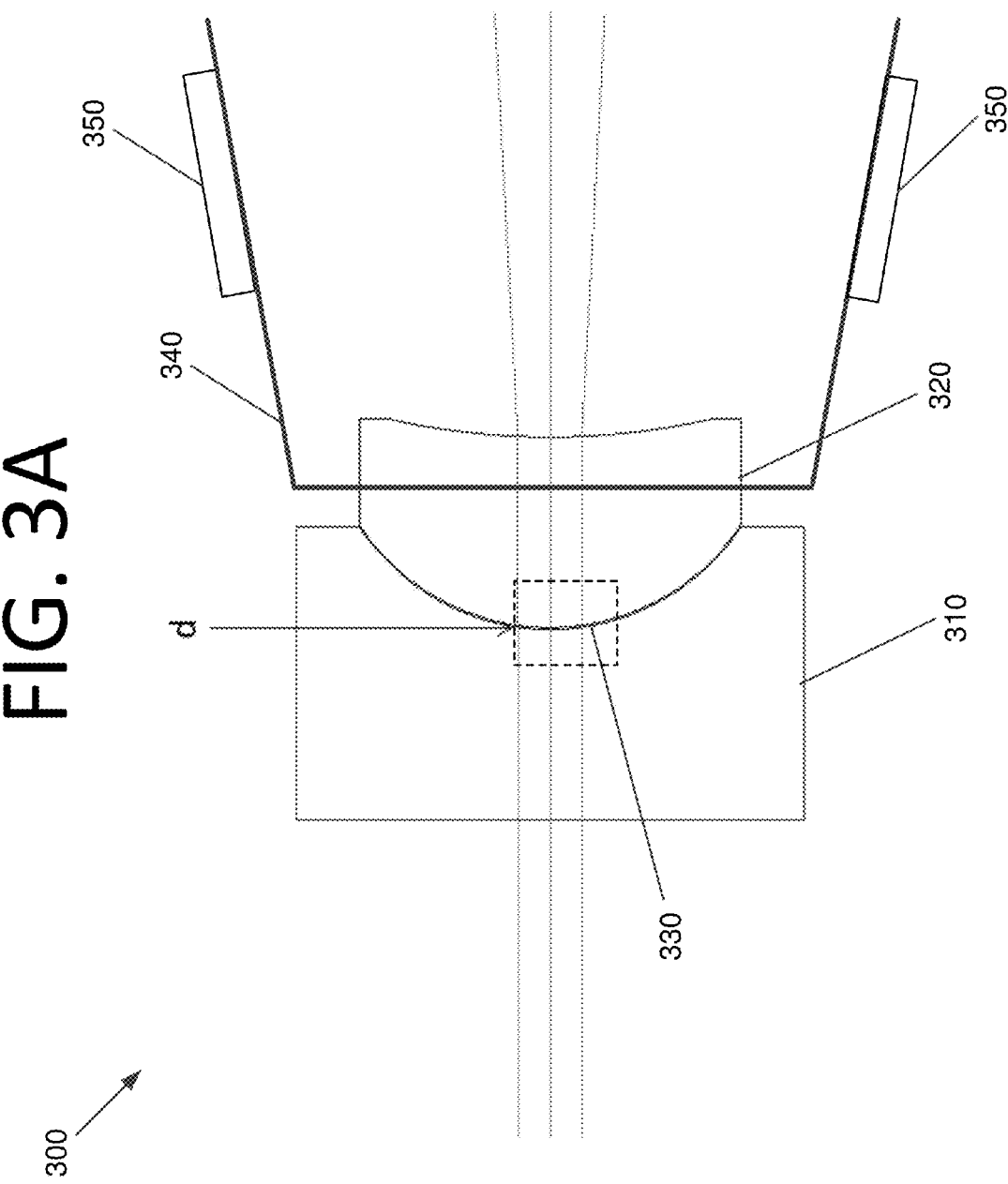

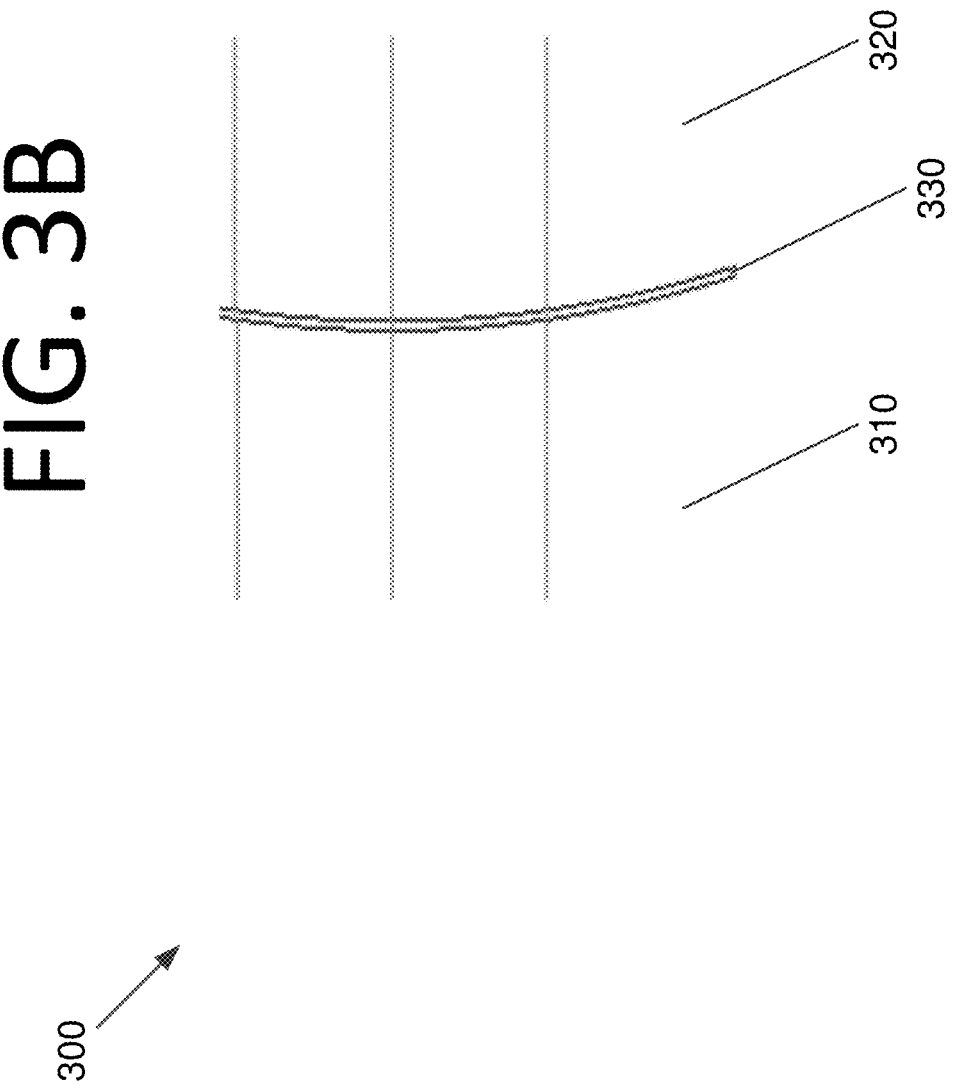

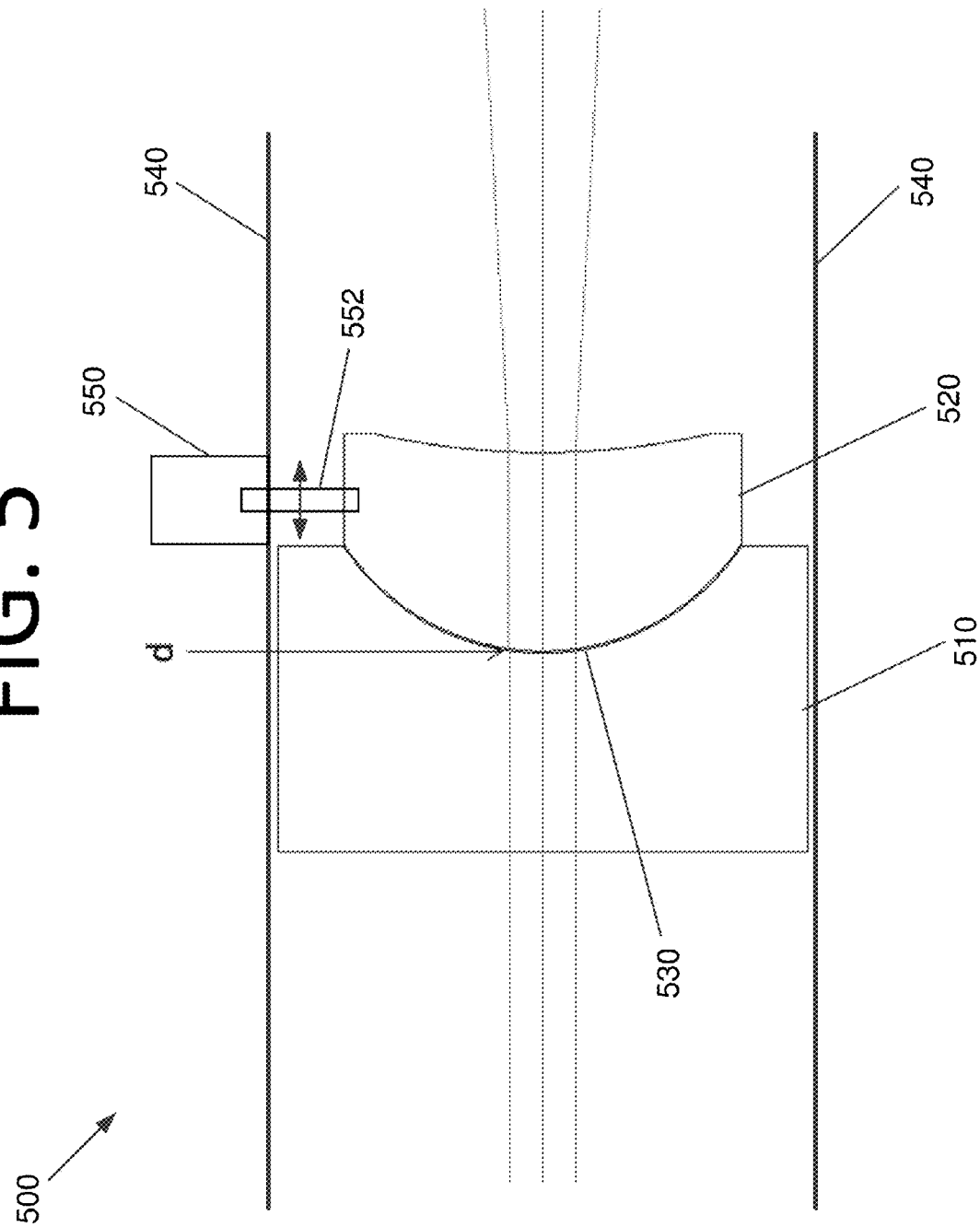

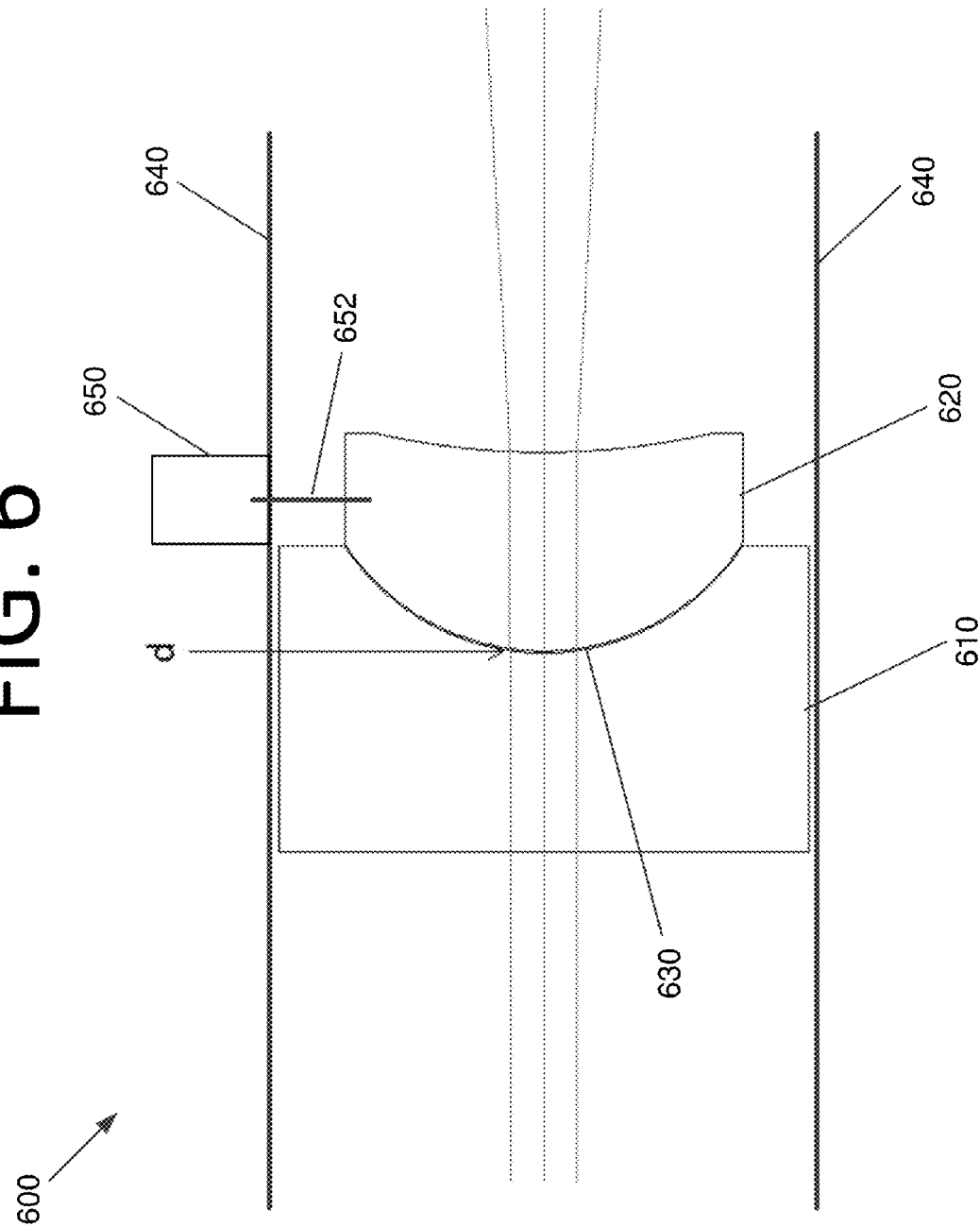

LASER BEAM EXPANDER WITH ADJUSTABLE COLLIMATION

STATEMENT OF FEDERAL RIGHTS

The invention described herein was made by employees of the United States Government and may be manufactured and used by or for the Government for Government purposes without the payment of any royalties thereon or therefore.

FIELD

The present invention generally relates to lasers, and more particularly, to a laser beam expander having at least two negative lenses with adjustable collimation.

BACKGROUND

A Galilean laser beam expander typically includes a single negative focal length lens on the input side and a multi-element positive focal length lens group on the output side. The divergence of a laser beam can be adjusted by changing the focal setting of the output telescope. More specifically, by changing the spacing between the negative input lens and the positive output lenses of the Galilean beam expander, the output telescope collimation and divergence of the output laser beam can be adjusted.

By mounting the lenses in a metal tube wrapped with a heater one could change the telescope focal setting by adjusting the beam expander tube temperature via heater power. However, a relatively large amount of motion (e.g., ~0.25 mm) may be required to achieve decollimation. One problem with this approach is that it may require a large change in tube temperature (e.g., 75-127° C.) to achieve such a change in spacing. The 0.25 mm spacing and 75-127° C. change in tube temperature are provided by way of example only for a specific beam expander magnification, tube length, and material. These factors will vary from one beam expander design to another. Accordingly, an improved laser beam expander may be beneficial.

SUMMARY

Certain embodiments of the present invention may provide solutions to the problems and needs in the art that have not yet been fully identified, appreciated, or solved by conventional laser beam collimation technologies. For example, some embodiments of the present invention pertain to a laser beam expander having at least two negative lenses with adjustable collimation.

In an embodiment, an apparatus includes a first negative lens configured to receive a laser beam and a second negative lens positioned after the first negative lens in a path of the laser beam such that a gap exists between the first negative lens and the second negative lens. Changing a size of the gap changes collimation of the laser beam when output by the second negative lens. A concave surface of the first negative lens most proximate to a convex surface of the second negative lens have matching curvatures.

In another embodiment, a Galilean laser beam expander includes a plurality of negative lenses configured to receive a laser beam. Each of the plurality of lenses has a gap between itself and a lens earlier in a path of the laser beam except for a first negative lens in the path. Changing sizes of one or more gaps between pairs of the plurality of negative lenses changes collimation of the laser beam when output by a last negative lens in the path of the laser beam.

In yet another embodiment, a laser beam expander includes a first negative lens configured to receive a laser beam and a second negative lens positioned after the first negative lens in a path of the laser beam such that a gap exists between the first negative lens and the second negative lens. The laser beam expander also includes a first tube connected to the first negative lens or the second negative lens and a heating element that supplies heat to the first tube. The heating element is configured to heat the first tube such that applying heat decreases a size of the gap via thermal expansion. Changing the size of the gap changes collimation of the laser beam when output by the second negative lens.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which:

FIG. 3A is an architectural diagram illustrating a laser beam expander, according to an embodiment of the present invention.

FIG. 3B is an architectural diagram illustrating a closeup view of the section of the laser beam expander of FIG. 3A denoted by the dashed rectangle, according to an embodiment of the present invention.

FIG. 5 is an architectural diagram illustrating a laser beam expander, according to an embodiment of the present invention.

FIG. 6 is an architectural diagram illustrating a laser beam expander, according to an embodiment of the present invention.

DETAILED DESCRIPTION OF THE EMBODIMENTS

Some embodiments of the present invention pertain to a laser beam expander having at least two negative lenses with adjustable collimation. The amount of required motion in some embodiments can be reduced by an order of magnitude over conventional approaches by splitting the input lens in two and adjusting the small remaining air gap between the lenses. In some embodiments, the change in collimation may be accomplished by heating/cooling (i.e., thermal), mechanical motion (e.g., geared or piezoelectric motors), electro-optical means (e.g., applying or reducing an electric current), any combination thereof, or any other suitable mechanism. The amount of required lens motion versus decollimation may be optimized by material selection for index of refraction and the curvature of the new interface within the two-part negative lens of some embodiments. For example, with respect to materials, fused silica, water clear zinc sulfide (e.g., CLEARTRAN®), crystals, etc. may be used, depending on the wavelength(s) of light that are desired. Collimation puts telescope components on the designed axis so collimated light emerges. Conversely, decollimation causes a beam to diverge from parallelism.

In general, a lens substrate with a higher index of refraction requires less curvature at the interface(s) between the negative lenses and leads to a better optical system correction. In other words, a better collimated beam is produced when it is desirable to use the beam expander at its optimum collimation setting. For example, fused silica and CLEARTRAN® have indexes of refraction of 1.46 and 2.29, respectively, in the visible light spectrum.

Some embodiments are particularly well suited for space-based applications. For instance, the laser beam expander of some embodiments may be used in spacecraft, such as in the NASA Flyby Lidar for Altimetry and Radiometry at Europa (FLARE) beam expander. However, embodiments may be used in any laser ranging instrument that utilizes a variable spot size as a function of range without deviating from the scope of the invention. More specifically, a smaller beam divergence is desired when the spacecraft is further away and a larger beam divergence is desired when the spacecraft is closer in order to maintain a relatively constant ground illumination spot size.

Figure 1:
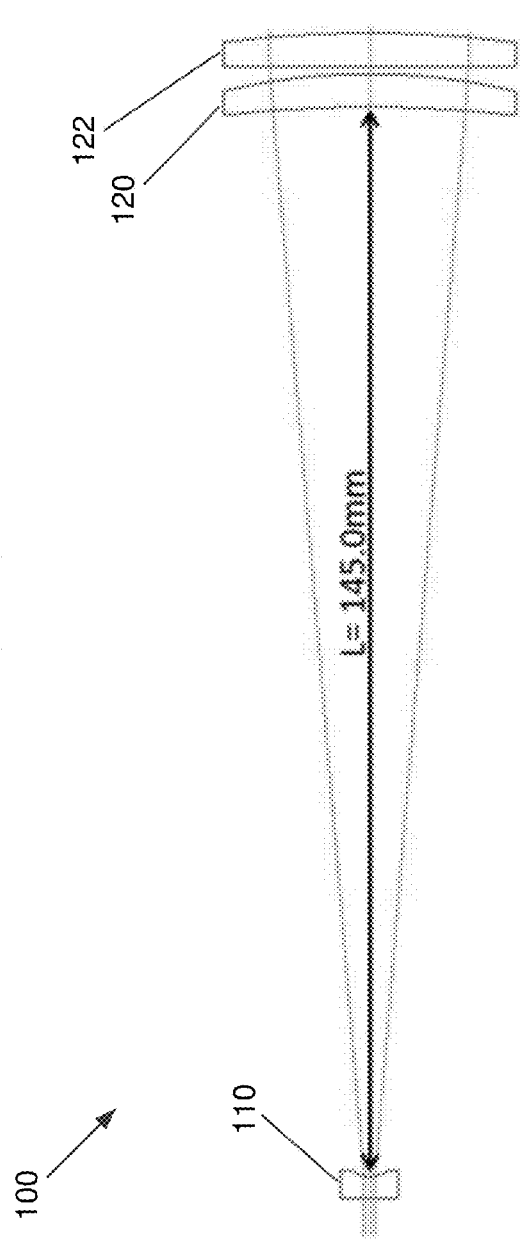
FIG. 1 is an architectural diagram illustrating a conventional Galilean laser beam expander.

In the case of FLARE, ~0.25 mm of motion was required with a typical Galilean laser beam expander in order to compensate for the different distances from Europa at which the spacecraft will operate and to keep the size of the laser beam illuminating Europa reasonably constant. FIG. 1 illustrates a conventional Galilean laser beam expander 100 designed for FLARE. In laser beam expander 100, a single negative lens 110 and multiple positive lenses (i.e., first positive lens 120 and second positive lens 122) are included. Negative lens 110 is contained within a tube (not shown). The distance L between negative lens 110 and first positive lens 120 is 145.0 mm in an unheated state, which produces an approximately 100 μrad beam divergence for the FLARE 1,064 nm wavelength laser.

In order to defocus the beam enough to obtain a ~200 μrad beam divergence, L needs to change by approximately ±0.25 mm. However, heating a tube housing a respective lens by 75-127° C. was required, which is expensive in terms of power that would be required to achieve the change. Assuming the use of aluminum for the tube, a ΔT of approximately 75° C. is required (23.0E-6 coefficient of thermal expansion (CTE)). Assuming the use of beryllium for the tube, a ΔT of approximately 127° C. is required (13.6E-6 CTE). Different temperatures would be required for different materials and alloys. This additional heat may also negatively impact other spacecraft systems.

Accordingly, some embodiments increase the sensitivity of the beam expander optical design such that the laser divergence adjustment can be accomplished with a much smaller tube temperature difference (ΔT). This permits laser beam divergence to be adjusted by moving components tens of microns as opposed to a quarter of a millimeter. Once the required range of motion is reduced to this level, a thermal implementation is easier to achieve. Use of a mechanical or electro-optical approaches would also be easier.

Figure 2:
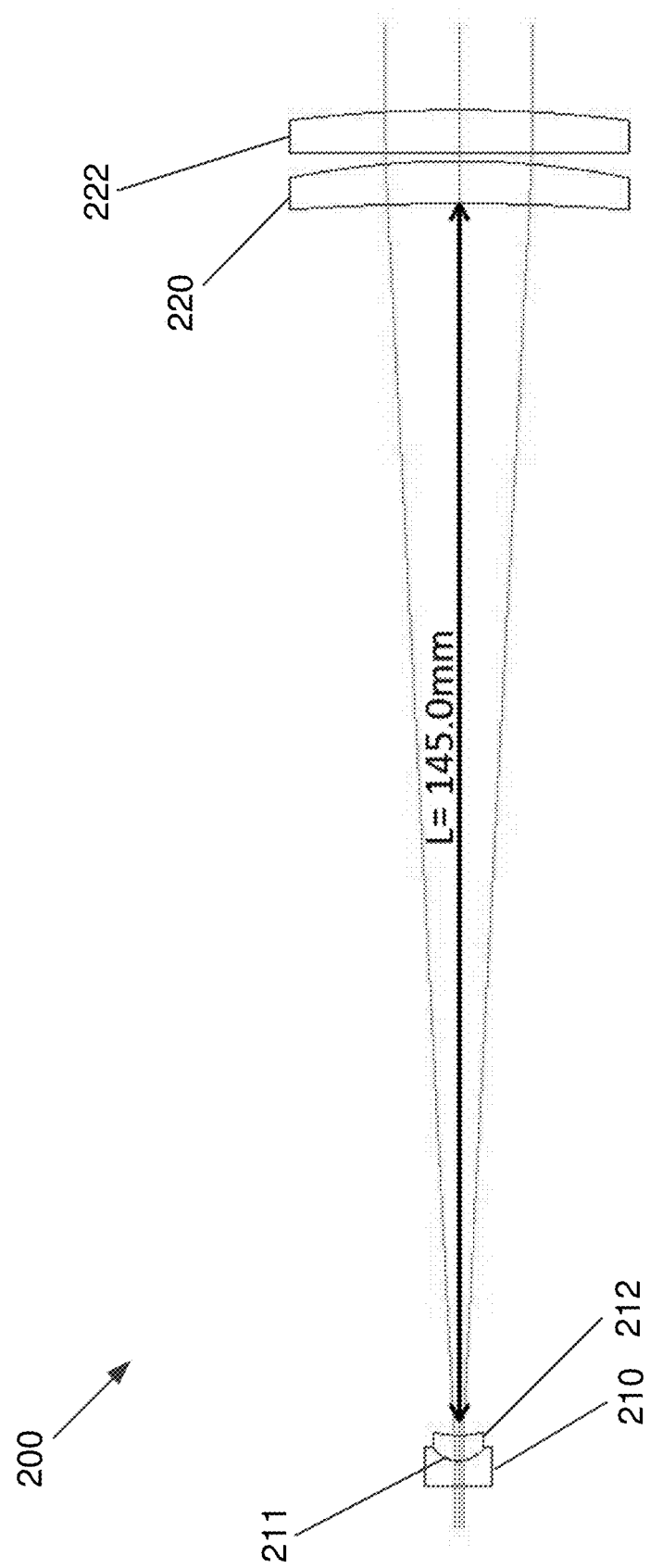
FIG. 2 is an architectural diagram illustrating a laser beam expander with multiple negative lenses, according to an embodiment of the present invention.

FIG. 2 is an architectural diagram illustrating a laser beam expander 200 with multiple negative lenses 210, 212, according to an embodiment of the present invention. While two negative lenses are shown here, any desired number of lenses may be used without deviating from the scope of the invention, each with associated gaps therebetween. Presumably, using a larger number of negative lenses will even further reduce the spacing adjustment.

As with Galilean laser beam expander 100 of FIG. 1, laser beam expander 200 also includes a first positive lens 220 and a second positive lens 222. However, negative lenses 210, 212 have a small gap 211 therebetween, as is better illustrated in FIGS. 3A and 3B. The smaller the gap, the smaller the ΔT that is required to refocus the beam. Surfaces of first negative lens 210 and second negative lens 212 that are most proximate to one another have matching curvatures. In other words, first negative lens 210 has a concave curved surface matching a convex surface of second negative lens 212 such that they would "fit" together if pressed against one another.

FIG. 3A is an architectural diagram illustrating a laser beam expander 300, according to an embodiment of the present invention. Laser beam expander 300 includes a first negative lens 310 and a second negative lens 320 that are separated by a gap 330 of distance d. In some embodiments, d may be 0.030 mm, for example. However, any desired gap sufficiently close as to be operable may be used without deviating from the scope of the invention.

Second negative lens 320 is housed within an inner high CTE tube 340. Tube 340 is conical in shape in this embodiment. However, a cylindrical tube, any other suitable hollow tube shape, or multiple connected tubes may be used in some embodiments without deviating from the scope of the invention. Heating elements 350 heat tube 340, and thus, second negative lens 320. When tube 340 is heated, gap 330 decreases due to thermal expansion of tube 340 moving second negative lens 320 to the left towards first negative lens 310 in this embodiment. However, in other embodiments, first negative lens 310 may be housed within a high CTE tube and may be moved by heating/cooling the tube.

Heating elements 350 may be or include one or more resistors, or be any other suitable heating element without deviating from the scope of the invention. The dashed rectangle denotes the area of FIG. 3A magnified in FIG. 3B such that gap 330 is more clearly visible. Assuming that tube 340 is a 145 mm aluminum tube, a ΔT of only 9° C. may be required in some embodiments.

Figure 4A:
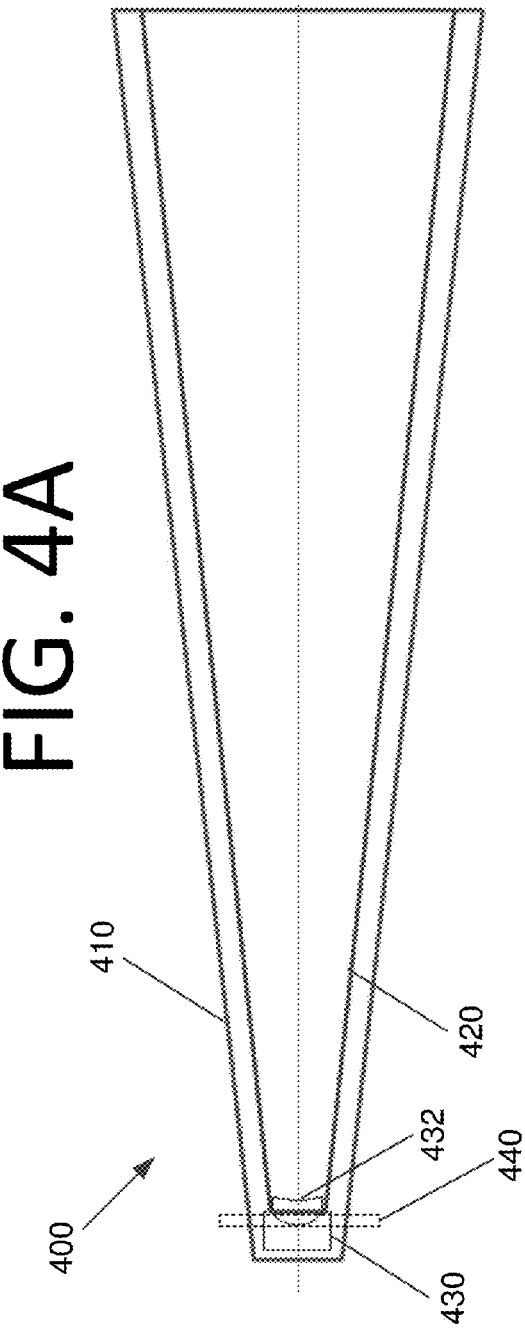
FIG. 4A is a side cutaway view illustrating a laser beam expander with conical tubes housing negative lenses, according to an embodiment of the present invention.
Figure 4B:
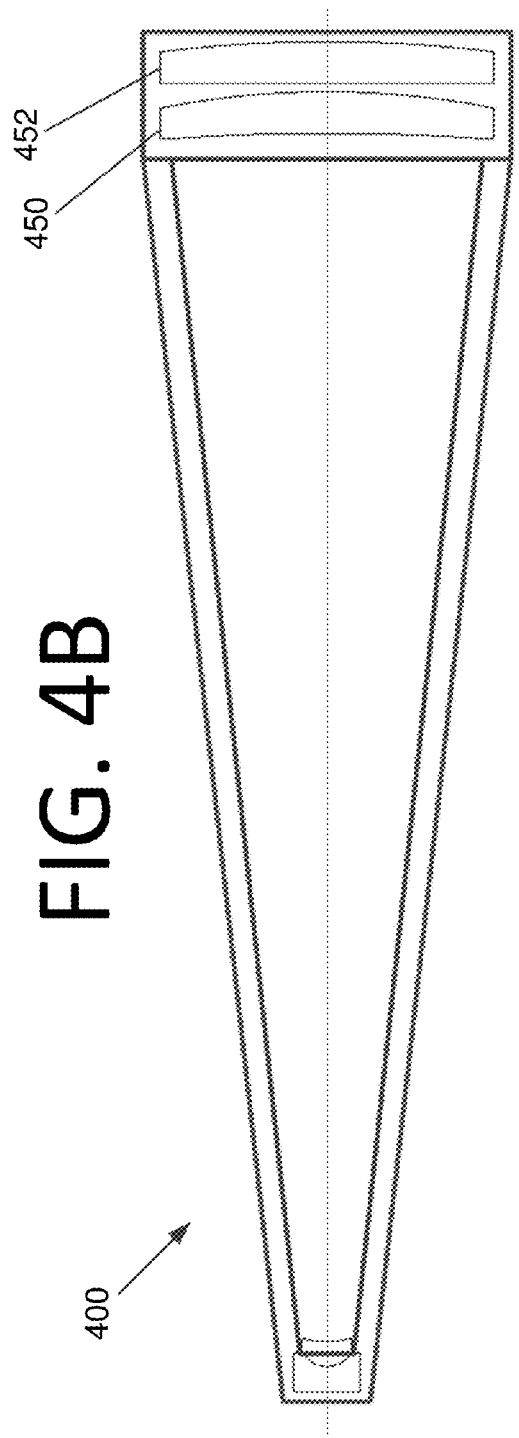
FIG. 4B is a side cutaway view illustrating the laser beam expander of FIG. 4A with positive lenses added, according to an embodiment of the present invention.

FIG. 4A is a side cutaway view illustrating a laser beam expander 400 with conical tubes 410, 420 housing negative lenses 430, 432 and FIG. 4B is a side cutaway view illustrating laser beam expander 400 of FIG. 4A with positive lenses 450, 452 added, according to an embodiment of the present invention. In this embodiment, tube 410 houses first negative lens 430 and is made from a relatively low CTE material, and tube 420 houses second negative lens 432 and is made from a relatively high CTE material. For instance, tube 410 may include aluminum and tube 420 may include a composite material. First negative lens 430 is mounted to tube 410 and second negative lens 432 is mounted to tube 420.

A heating element 440 provides heat to tubes 410, 420. In this embodiment, heating element 440 is outside of tube 410, which is itself outside of, and surrounds, tube 420. However, in some embodiments, such as that shown in FIG. 3A, one or more heating elements may be inside tube 410 and contact tube 420 in order to better provide heat thereto.

When heating element 440 is providing heat to tubes 410, 420, tube 420 expands more than tube 410 due to its higher CTE. Thus, tube 420 moves second negative lens 432 further to the left than tube 410 moves first negative lens 430. This provides an overall decrease in a gap between first negative lens 430 and second negative lens 432.

Per the above, other mechanisms of changing the spacing of the gap are used in some embodiments. FIG. 5 is an architectural diagram illustrating a laser beam expander 500, according to an embodiment of the present invention. Laser beam expander 500 includes a first negative lens 510 and a second negative lens 520 that are separated by a gap 530 of distance d. First negative lens 510 and second negative lens 510 reside within a single tube 540 in this embodiment since thermal expansion is not used to modify d. However, any number and shape of tubes may be used in some embodiments without deviating from the scope of the invention.

In this embodiment, laser beam expander 500 has a motor 550 (e.g. a piezoelectric focusing element, a motor with gears, etc.) that is connected by a connector 552 to second negative lens 520. However, in in some embodiments, motor 550 is connected to first negative lens 510, or both negative lenses 510, 520 have one or more associated motors. Motor 550, via connector 552, moves second negative lens 520 in a horizontal direction, thereby increasing or decreasing gap 530. However, in some embodiments, the motion is not purely horizontal, and would appear slightly diagonal with respect to FIG. 5.

FIG. 6 is an architectural diagram illustrating a laser beam expander 600, according to an embodiment of the present invention. Laser beam expander 600 includes a first negative lens 610 and a second negative lens 620 that are separated by a gap 630 of distance d. First negative lens 610 and second negative lens 620 reside within a tube 640.

However, instead of using a heating element or a mechanical mechanism such as a motor, in this embodiment, laser beam expander 600 has an electrical current source 650 that is connected by a lead 652 to second negative lens 620. However, in in some embodiments, the lead is connected to first negative lens 610, or both negative lenses 610, 620 have one or more associated leads from one or more electrical current sources. Second negative lens is made from a material (e.g., lithium niobate, lithium tantalite, lithium triborate (LBO), potassium titanyl phosphate (KTP), etc.) with electro-optical properties that change in index of refraction or polarization effects when a current is applied. The effect on decollimation is similar to a change in spacing. When no current is applied, the index of refraction of second negative lens 620 remains in its normal state.

Figure 7:
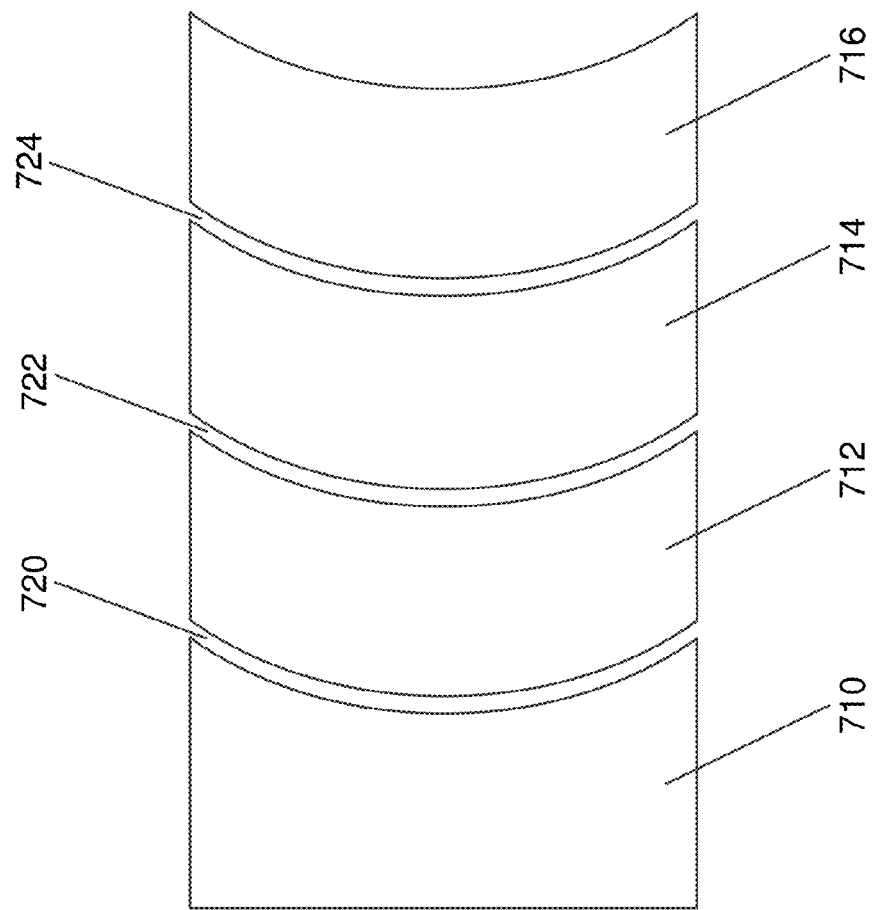
FIG. 7 is a side view of a negative lens arrangement illustrating multiple negative lenses, according to an embodiment of the present invention.

FIG. 7 is a side view of a negative lens arrangement 700 illustrating multiple negative lenses 710, 712, 714, 716, according to an embodiment of the present invention. Negative lenses 710, 712, 714, 716 are not necessarily drawn to scale or as having the correct shape. Rather, FIG. 7 is merely intended to illustrate that more than two negative lenses may be used in some embodiments. Gap 720 exists between negative lenses 710, 712, gap 722 exists between negative lenses 712, 714, and gap 724 exists between negative lenses 714, 716. By including multiple gaps and lenses, smaller movements may be required, further reducing the amount of heat, mechanical motion, and/or current required to facilitate collimation/decollimation.

It will be readily understood that the components of various embodiments of the present invention, as generally described and illustrated in the figures herein, may be arranged and designed in a wide variety of different configurations. Thus, the detailed description of the embodiments of the present invention, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. An apparatus, comprising:
a first negative lens configured to receive a laser beam; and
a second negative lens positioned after the first negative lens in a path of the laser beam such that a gap exists between the first negative lens and the second negative lens, wherein
changing a size of the gap changes collimation of the laser beam when output by the second negative lens; and
the first negative lens, the second negative lens, or both, are moved by any combination of thermal, mechanical, and/or electro-optical mechanisms; and
a concave surface of the first negative lens most proximate to a convex surface of the second negative lens have matching curvatures.

2. The apparatus of claim 1, further comprising:
the first tube and the second tube have different coefficients of thermal expansion (CTEs) such that when heated, the tube with the higher CTE moves its respective lens via thermal expansion more than the tube with the lower CTE, thereby changing the size of the gap between the first negative lens and the second negative lens.

3. The apparatus of claim 2, wherein the first tube and the second tube are conical in shape.

4. The apparatus of claim 2, further comprising
a heating element configured to heat the first tube, the second tube, or both, such that applying heat decreases a size of the gap via thermal expansion of the first tube, the second tube, or both.

5. The apparatus of claim 1, further comprising:
a motor operably connected to the first negative lens, the second negative lens, or both, wherein
the motor is configured to move the first negative lens, the second negative lens, or both, such that the gap is increased or decreased.

6. The apparatus of claim 1, further comprising:
an electrical current source configured to provide an electrical current to the first negative lens, the second negative lens, or both, such that an index of refraction of the first negative lens, the second negative lens, or both, is changed, changing the collimation based on an amount of the electrical current that is applied.

7. The apparatus of claim 1, further comprising:
at least one additional negative lens in the path of the laser beam after the second negative lens,
wherein the at least one additional lens is positioned such that a gap exists between each additional negative lens and a previous negative lens earlier in the path or the laser beam.

8. The apparatus of claim 1, wherein the gap is 0.030 mm or less.

9. A Galilean laser beam expander, comprising:
a plurality of negative lenses configured to receive a laser beam, each of the plurality of lenses having a gap between itself and a lens earlier in a path of the laser beam except for a first negative lens in the path, and
a concave surface of the first negative lens most proximate to a convex surface of the second negative lens have matching curvatures, wherein
changing sizes of one or more gaps between pairs of the plurality of negative lenses changes collimation of the laser beam when output by a last negative lens in the path of the laser beam.

10. The Galilean laser beam expander of claim 9, further comprising:
a tube housing at least one of the plurality of negative lenses or a set of nested tubes each holding one of a plurality of negative lenses, wherein
when the tube or set of tubes is heated, the tube or plurality of tubes move respective housed lenses via thermal expansion, thereby changing a size of at least one gap between respective negative lenses.

11. The Galilean laser beam expander of claim 10, further comprising:
a heating element configured to heat the tube such that applying heat decreases at least one gap via thermal expansion.

12. The Galilean laser beam expander of claim 9, further comprising:
a motor operably connected to at least one of the negative lenses, wherein the motor is configured to move the at least one gap between respective negative lenses is increased or decreased.

13. The Galilean laser beam expander of claim 9, further comprising:
an electrical current source configured to provide an electrical current to at least one of the negative lenses such that an index of refraction of the first negative lens, the second negative lens, or both, is changed, changing the collimation based on an amount of the electrical current that is applied.

14. The Galilean laser beam expander of claim 9, wherein one or more of the plurality of negative lenses, are moved by any combination of thermal, mechanical, and/or electro-optical mechanisms.

15. The Galilean laser beam expander of claim 9, wherein each gap is 0.030 mm or less.

16. A laser beam expander, comprising:
a first negative lens configured to receive a laser beam;
a second negative lens positioned after the first negative lens in a path of the laser beam such that a gap exists between the first negative lens and the second negative lens;
a first tube connected to the first negative lens or the second negative lens; and
a heating element that provides heat to the first tube, the heating element configured to heat the first tube such that applying heat decreases a size of the gap via thermal expansion, wherein
changing the size of the gap changes the collimation of the laser beam when output by the second negative lens.

17. The laser beam expander of claim 16, further comprising:
a second tube connected to whoever of the first negative lens or the second negative lens that the first tube is not connected to, wherein
the first tube and the second tube have different coefficients of thermal expansion (CTEs) such that when heated, the tube with the higher CTE moves its respective lens via thermal expansion more than the tube with the lower CTE, thereby changing the size of the gap between the first negative lens and the second negative lens.

18. The laser beam expander of claim 16, further comprising:
at least one additional negative lens in the path of the laser beam after the second negative lens, wherein the at least one additional lens is positioned such that a gap exists between each additional negative lens and a previous negative lens earlier in the path of the laser beam.

* * * * *